(12) United States Patent
Liu et al.

(10) Patent No.: US 11,315,604 B2
(45) Date of Patent: Apr. 26, 2022

(54) THUMBNAIL VIDEO PLAYER FOR VIDEO SCRUBBING

(71) Applicant: ADOBE INC., San Jose, CA (US)

(72) Inventors: Fang Liu, Redmond, WA (US); Peiying Huo, Concord, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/726,110

(22) Filed: May 29, 2015

(65) Prior Publication Data

US 2016/0351229 A1 Dec. 1, 2016

(51) Int. Cl.
*G11B 27/10* (2006.01)
*G11B 27/34* (2006.01)

(52) U.S. Cl.
CPC ............ *G11B 27/102* (2013.01); *G11B 27/34* (2013.01)

(58) Field of Classification Search
USPC .................................. 386/239–248, 278–290
See application file for complete search history.

(56) References Cited

U.S. PATENT DOCUMENTS

| | | | | |
|---|---|---|---|---|
| 2007/0189717 A1* | 8/2007 | Yun | ................ | H04N 21/440263 |
| | | | | 386/230 |
| 2008/0148152 A1* | 6/2008 | Blinnikka | ............. | G06F 3/0486 |
| | | | | 715/719 |
| 2008/0292267 A1* | 11/2008 | Yamada | ............. | G11B 20/1217 |
| | | | | 386/241 |
| 2013/0071095 A1* | 3/2013 | Chauvier | ............. | G11B 27/005 |
| | | | | 386/343 |
| 2015/0296274 A1* | 10/2015 | Good | ................ | H04N 21/26258 |
| | | | | 725/93 |
| 2015/0382042 A1* | 12/2015 | Wagenaar | ............. | H04L 65/605 |
| | | | | 725/34 |
| 2016/0307596 A1* | 10/2016 | Hardin | ................ | H04N 21/8549 |
| 2016/0314819 A1* | 10/2016 | Elsner | .................. | H04N 19/136 |
| 2017/0006081 A1* | 1/2017 | Grandl | ..................... | H04L 65/80 |
| 2017/0250882 A1* | 8/2017 | Kellicker | ................ | H04L 67/16 |
| 2017/0310731 A1* | 10/2017 | Thomas | ............. | H04L 65/1083 |

* cited by examiner

*Primary Examiner* — Hung Q Dang
(74) *Attorney, Agent, or Firm* — Shook, Hardy & Bacon L.L.P.

(57) ABSTRACT

In various embodiments, methods and systems for providing video scrubbing based on thumbnail video players are provided. An indication to review video content on a video player is received. The video content corresponds to a thumbnail video in a playlist that supports a thumbnail video player. In particular, the playlist includes a thumbnail video variant constructively as a variant of the video content. The thumbnail video variant is referenced from the playlist to locate the thumbnail video. A video player development component supports generating, packaging, and communicating instructions for the providing the thumbnail video in a thumbnail video player. The thumbnail video is communicated for display on the thumbnail video player as continuous thumbnail video for video scrubbing the video content. It is contemplated that a selection indication associated with a portion of the thumbnail video triggers navigation to a corresponding portion in the video content in the video player.

23 Claims, 8 Drawing Sheets

THUMBNAIL VIDEO PLAYER FOR VIDEO SCRUBBING

BACKGROUND

Video scrubbing generally refers to traversing video content to locate a particular portion of the video content. Video players can support video scrubbing functionality usually using image thumbnails. Image thumbnails can provide snapshots representing portions of the video content, such that, a user traversing a timeline of the video content can identify and select a portion of the video content for preview. Image thumbnails that facilitate video scrubbing, based on snapshots taken over intervals can limit the video scrubbing experience. For example, image thumbnails do not provide thumbnails as uninterrupted video. A comprehensive development platform that facilitates a thumbnail video player, that previews uninterrupted video content, can improve the user experience and accuracy of video scrubbing implementations on video players.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein provide methods and systems for providing video scrubbing based on a thumbnail video player feature. An indication to review video content on a video player is received. The video content is associated with a thumbnail video based on a playlist that supports the video content and the thumbnail video. In particular, the playlist includes a thumbnail video variant constructed as a bitrate variant of the video content. The thumbnail video variant is referenced from the playlist (e.g., a master playlist) to locate the thumbnail video. A video player development component supports generating, packaging, and communicating instructions for the providing the thumbnail video in a thumbnail video player. The thumbnail video is communicated for display on the thumbnail video player as continuous thumbnail video for video scrubbing and previewing the video content. It is contemplated that a selection indication associated with a portion of the thumbnail video triggers navigation to a corresponding portion of the video content in the video player.

BRIEF DESCRIPTION OF THE DRAWINGS

The present invention is described in detail below with reference to the attached drawing figures, wherein.

DETAILED DESCRIPTION

Various terms are used throughout this description. Although more details regarding various terms are provided throughout this description, general definitions of some terms are included below to provider a clearer understanding of the ideas disclosed herein:

A video player refers to a media player for playing back digital video content. The digital video content can exist in a variety of digital video formats. Video players usually support basic functionality such as playing, stopping, rewinding, forwarding, and pausing. Video players can also specifically support video scrubbing sometimes using image thumbnails that are served when a user previews video content along a timeline of the video content.

A thumbnail video player refers to a video player that is generated to facilitate video scrubbing. The thumbnail video player can be a secondary video player that is generated to playback thumbnail videos. The thumbnail video player may be a miniature video player that playbacks thumbnail video of video content on the video player. In particular, the thumbnail video player plays back continuous and uninterrupted thumbnail video based on a video player platform. Advantageously, the thumbnail video can be played back adjacent to the timeline as a user traverses the timeline to locate a portion of video content.

A media communications protocol refers to a set of rules used to exchange media content between computing devices. A media communications protocol may specifically be defined for streaming media (e.g., APPLE HTTP Live Streaming—HLS). A media streaming communications protocol can operate by segmenting the complete stream of video content into a sequence of small HTTP-based file downloads, each download loading short chunks of the complete stream of video. The media communications protocol can also support associating video content and thumbnail video with corresponding video content profiles and thumbnail video profiles. The media communications protocol can facilitate generating playlists (e.g., .m3u8 files) to instruct how to play video content and corresponding thumbnail video. A media communications protocol can further support a policy service includes procedures for communicating video content and thumbnail video.

A video player platform refers integrated components of hardware architecture and/or software framework that support a video player and a thumbnail video player. The video player platform can specifically support a media communications protocol. The video player platform can implement a software development kit that includes software development tools that allow for the implementation of a video player and thumbnail video player. The software development kit can include application programming interfaces in the form of routines, protocols, and tools and also include an integrated development environment for debugging functionality and other utilities.

Image thumbnails refer to snapshots representing portions of the video content, such that, a user traversing a timeline of the video content can identify and select a portion of the video content. Image thumbnails can be implemented with image snapshots taken over defined intervals (e.g., several seconds) to support video scrubbing on a video player.

A variant service refers to a feature that can be supported using a media communication protocol where video content can be provided as several variants or alternate streams containing the same material encoded at a variety of data rates (e.g., bitrates) and sizes (e.g., width and height), and/or served from different server locations. The different streams can be communicated in a playlist that is accessed during playback of the video content at the video player. It is contemplated that variants can be implemented for both the video content in the video player and the thumbnail video in the thumbnail video player. In particular, thumbnail video variants can be for different bitrates and resolutions and can also be configured for different media devices or platforms, with considerations for specific parameters (e.g., display sizes and network conditions).

A video profile is a record of attributes and metadata of a video content or thumbnail video. A video content profile or thumbnail video profile is a type of video profile. A video profile can be implemented as different variants with corresponding tags or directives, an identifier, variation information (e.g., a bandwidth, a resolution), a video-only setting, and a location of segmented files of a video. A variant service allows the streaming session to adapt to different data rates. A variant of a profile can be tagged on a playlist and packaged to support video content playback of a video profile and thumbnail video playback of a thumbnail video profile.

A video player instance refers to configuration instructions for a video player development component to package video with video content profiles, thumbnail video profiles, and policy services. For example, a video player instance component can be used to generate instructions for the type of video content (e.g., live or recorded video), the source of the video content, and the resolution for the video content. The thumbnail video content defined in a video player instance component can specifically correspond to a resolution that is lower resolution than the a resolution of the video content, variant settings (e.g., bit rate, bandwidth, resolution), video-only setting, and a thumbnail video policy for restricting access to the thumbnail video from the video player.

Conventionally, image thumbnails facilitate video scrubbing, based on snapshots taken over intervals. Such implementations of video scrubbing can limit the video scrubbing experience, in that, the image thumbnails do not provide thumbnails as uninterrupted video. A thumbnail video player, that previews uninterrupted video content, can improve the user experience and accuracy of video scrubbing implementations on video players.

Embodiments of the present invention provide simple and efficient methods and systems for providing video scrubbing based on a video player platform that supports a thumbnail video player. A video player of a media device can receive a video player package that includes a playlist referencing video content and thumbnail video. The video player, upon accessing the video player package, can support video scrubbing of the video content being played on video player using a thumbnail video that is played on a thumbnail video player. The video package includes a compact size, low resolution, and video only thumbnail video. Loading and decoding the thumbnail video consumes limited resources on the video player platform. The thumbnail video is packaged using the same media communications protocol as the video content that supports both video content profiles and thumbnail video profiles corresponding to the video content and the thumbnail video. The thumbnail video profiles are implemented with the video content profiles in playlists that include variants that support adaptive bit rates for different types of media device platforms, changing network conditions, and failover protection.

In operation, the video player can receive the video package and playback the video content using a video content variant. Upon receiving an indication to review the video content, the video player can generate a thumbnail video player that plays back the thumbnail video in a thumbnail video player using a thumbnail video variant. The thumbnail video playback is continuous and more accurate than snippets of image thumbnails in previous video players. In this regard, the thumbnail video enhances a user video scrubbing experience on the video player via the thumbnail video player.

The video player platform can support various additional features in thumbnail video player. For example, the thumbnail video can be implemented for both live streaming and video on demand (VOD) video content. The video player platform can also support the video content profiles, thumbnail video profiles, and also image thumbnail profiles in the same video package, where image thumbnails can be implemented as backups for thumbnail video. In embodiments described herein, the video player platform further includes comprehensive development components that facilitate generating, packaging and communicating video player instances and video player packages for providing video scrubbing using thumbnail video players.

Accordingly, in a first embodiment described herein, one or more computer storage media having computer-executable instructions embodied thereon that, when executed, by one or more processors, causes the one or more processors to perform a method for providing video scrubbing using thumbnail players is provided. The method includes accessing a video player package, the video player package comprising a playlist having a video content variant and thumbnail video variant. The method includes generating a video player for video content; the video content is accessed based on the playlist having the video content variant. The method further includes receiving an indication to review the video content. The method further includes generating a thumbnail video player for thumbnail video, the thumbnail video is accessed based on the playlist having the thumbnail variant.

In a second embodiment described herein, a computer-implemented method for providing video scrubbing using thumbnail video players is provided. The method includes accessing a video player instance for video content and thumbnail video. The video player instance comprises configuration instructions for video content and thumbnail video content. The method further includes generating a video player package for the video content and the thumbnail video. The video player package comprises a playlist having a video content variant and a thumbnail video variant.

In a third embodiment described herein, a system for providing video scrubbing using thumbnail video players is provided. The system comprises a processor and a memory configured for providing computer program instructions to the processor. The system further comprises a video player component configured for: accessing a video player package, the video player package comprises the playlist having a video content variant a thumbnail video variant; generating a video player for the video content, the video content is accessed based on the playlist; receiving an indication to review the video content; and generating a thumbnail video player for the thumbnail video, wherein the thumbnail video is accessed based on the playlist.

Figure 1A:
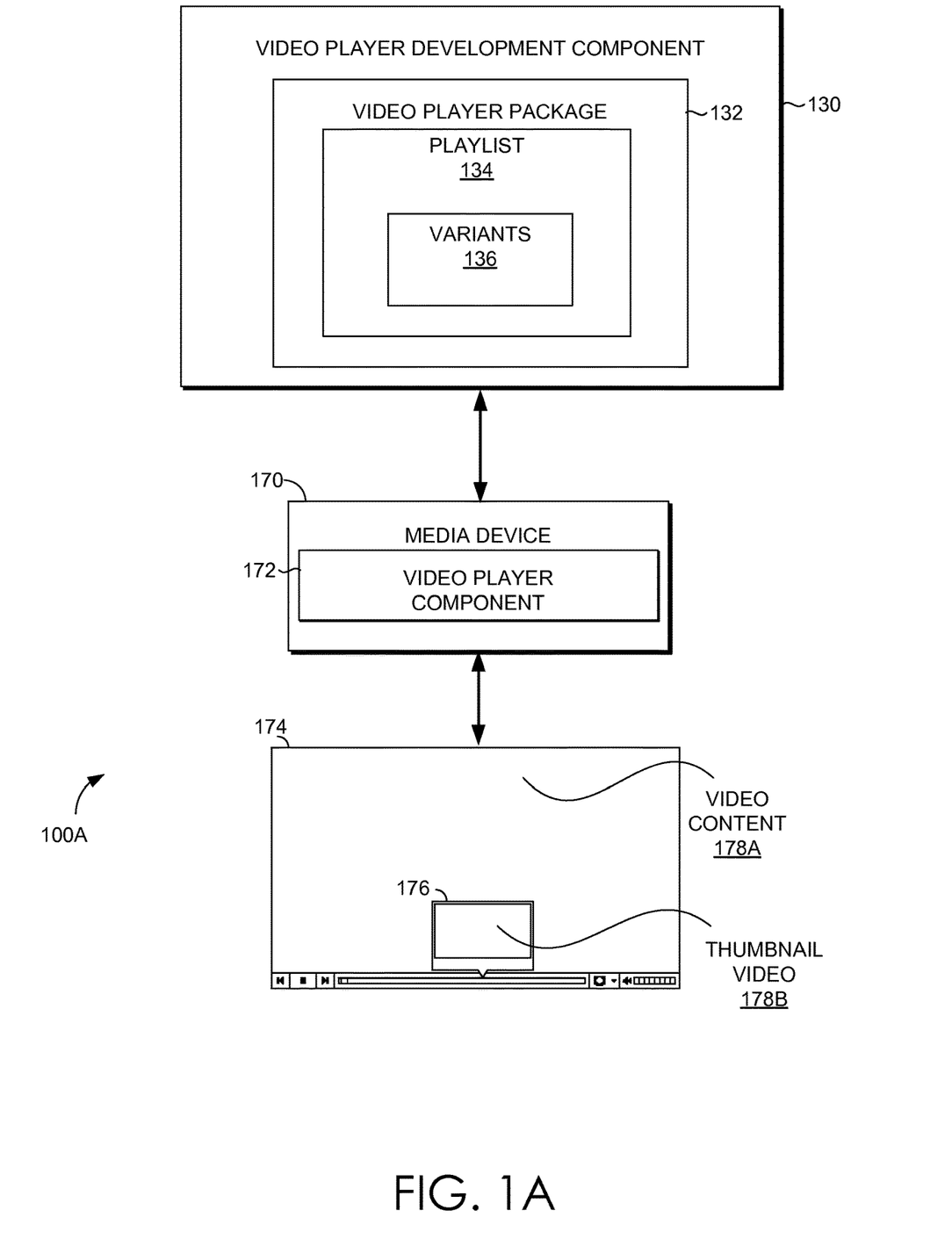
FIGS. 1A and 1B are block diagrams of an exemplary video player platform system in which embodiments described herein may be employed.
Figure 1B:
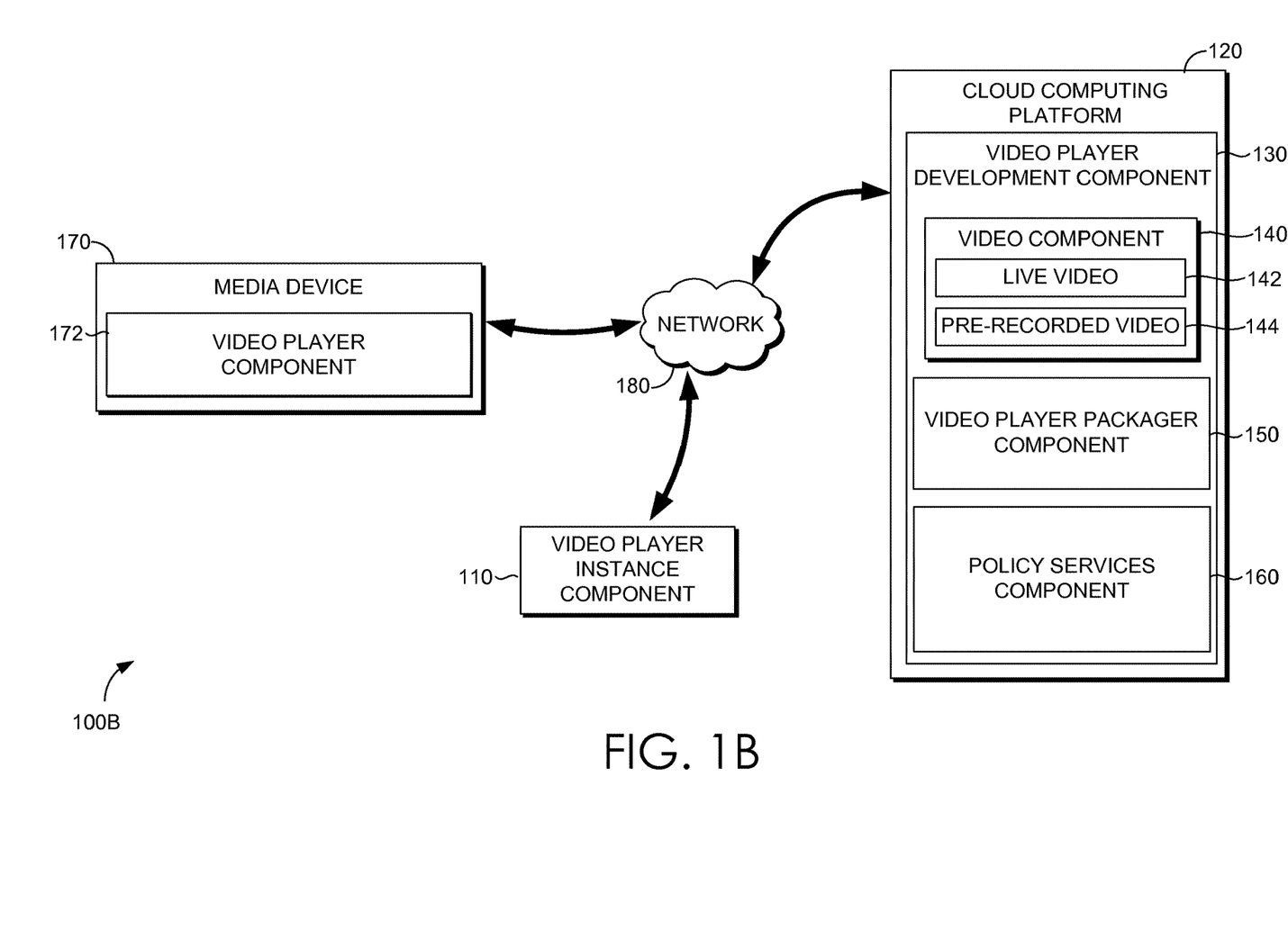

Referring now to FIGS. 1A-1B, FIGS. 1A and 1B illustrate an exemplary video player platform system ("video player system") 100A and 100B (collectively 100) in which implementations of the present disclosure may be employed. In particular, FIGS. 1A and 1B show a high level architecture of video player system 100 having an infrastructure and communicating using components in accordance with implementations of the present disclosure.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With initial reference to FIG. 1A, FIG. 1A includes video component 130, a video player package 132 having a playlist 134 and variants 136; a media device 170 having a video player component 172, video player 174, thumbnail video player 176, and video content 178A and thumbnail video 178B.

At a high level, the video player development component 130 can support generating, packaging, and communicating a video player package 132. The video player package 132 can include a playlist 134 that supports video content profiles and thumbnail video profiles. The playlist can indicate the location of video content and corresponding thumbnail video. The thumbnail video can be a lower resolution and video-only version of the video content. The thumbnail video and the video content can each have corresponding thumbnail video profiles and video profiles, tags and variants defined in the playlist based on a media communications protocol. In particular, a thumbnail video variant can have a tag, such that, the video content playback on a video player and adaptive bit rate changes of the video player bypass the thumbnail video variant in a playlist.

The video player development component 130 can communicate the video player package 132 for supporting video content 178A and thumbnail video 178B playback at media device 170 using the video player component 172. The video content 178A can be played back using video player 174 and the thumbnail video 178B can be played back using thumbnail video player 176. The thumbnail video 178B can be for live or video on demand. The live thumbnail video variant profiles and video on demand thumbnail video variant profiles can be supported using the same video player platform. The thumbnail video player 176 can be played back based on an indication (e.g., click, touch, or gesture) to scrub the video content. As such, the video scrubbing functionality can be of continuous video which are more accurate than providing snapshots.

Turning now to FIG. 1B, among other components not shown, video player system 100B includes a video player instance component 110, a cloud computing platform 120 comprising a video player development component 130 having a video component 140, a video player packager component 150, and policy services component 160, and a media device 170 having a video player component 172 all in communication in in a local area network 180. The components of the video player system 100B may communicate with each other over a network, which may include, without limitation, one or more local area networks (LANs) and/or wide area networks (WANs). Any number of nodes (e.g., servers) and client computing devices may be employed within the video player system 100 within the scope of implementations of the present disclosure.

At a high level, in the video player system 100B, the components are provided by a video player platform. The video player platform comprises several components operating together to provide a video player having a thumbnail video player feature as described herein. The video player instance component 110 can be used to generate video player instances that are used to initialize a video player having a thumbnail video player feature and other cloud-based video player services (e.g., policy services, video analytics, ad management, ad insertion). The video player instance component 110 can be based on a software development kit (SDK) of the video player platform. Generating video player instances can be based on an integrated development environment that provides comprehensive facilities for developing video player instances through the video player development component 130.

The video player instance component 110 can communicate the video player instance to the video player development component 130 where the video player instance can be stored, processed and used to generate a video player package that facilitates transmitting with video content and thumbnail video from video component 140 to the video player component 172. The video player component 172 can receive the video content for playback and thumbnail video for video scrubbing playback.

Having described various aspects of the video player system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Various aspects of the technology described herein are generally directed to systems, methods, and computer storage media for, among other things, generating interactive content on media devices. A media device 170 (e.g., computing device, television, mobile device, game console) may communicate with a cloud computing platform 120 to receive video content and thumbnail video based on a playlist that supports a thumbnail video player feature. Initially, video content can be generated by content producers. Content producers can generate pre-recorded video content or live content and process the video content using a video component 140 having live video 142 and pre-recorded video 144 units. The video component 140 can be accessed or referenced using the video player instance component 110 when generating video player instances. In one embodiment, the video component 140 can be implemented in the video player development component of a cloud computing platform, such that, the video streams that contain video content are delivered from the video player development component 130 to media devices. Live video content can be retrieved based on a configured live video feed source (e.g., Internet Protocol address). As such, the video player can support live thumbnail video profiles and VOD thumbnail video profiles.

The video player instance component 110 can facilitate developing video player instances associated with video content and thumbnail video. It is contemplated that generating video player instances at the video player instance component 110 may trigger creation of corresponding project files and folders in the video player development component 130. The video player instance component 110 can optionally be implemented as a cloud-based application accessed remotely using a computing device. It is contemplated that the generation of video player instances can also be automated based on default settings and configurations such that video content and thumbnail video are managed seamlessly. The video player instance component 110 can, in embodiments, be utilized to develop video player instances that operate with a media communications platform, specifically for streaming video content (e.g., HLS). A computing device (e.g., media device 170) can support a video player (e.g., video player component 172) that implements video player packages generated based on video player instances developed at the video player instance component 110.

Video player instances can include instructions for defining and selecting video content and thumbnail video profiles that are used in a playlist. Instructions can include configuration settings and selections of various attributes for video profiles for the video content and thumbnail video and corresponding video players and thumbnail players. For example, the video player instance component can be used to generate instructions for the type of video content (e.g., live or recorded video), the source of the video content, a resolution for the video content. The thumbnail video content can be of a lower resolution than a resolution of the video content. The instructions can further define variant settings, the thumbnail video as video-only, and a thumbnail video policy for limiting access only to the thumbnail video from the thumbnail video player. Other variations and combinations of instructions for generating video player instances are contemplated with embodiments of the present invention.

Generating the video player instances can further include content preparation, variable bitrate selection, and hooks to collect engagement and quality of experience data. It is contemplated that the video player and cloud-based video player services are implemented based on video player instances. The video player instances define configuration instructions for the video player development component 130 to package video based on the corresponding video content profiles, thumbnail video profiles, and policy services. The video player development component 130 can retrieve, store, and process, the video player instance to generate a video player package for video content and thumbnail video.

The video player packager component 150 is responsible for generating a video package that is communicated to a media device. The video package includes instructions for generating video content on a video player and a thumbnail video on a thumbnail video player. The thumbnail video player can be generated for video scrubbing the video content. The video package can be generated based on the video player instance and a media communications protocol. In one embodiment, the video player packager component 150 can access the video content component to downsize the video content to a lower resolution. For example, a video content resolution can be 1280×720 that is downsized to 160×120 as such the thumbnail video resolution is a lower resolution than the resolution of the video content. An audio track associated with the video content may also be removed. The video-only downsized video content can be packaged into small segments and identified as the thumbnail video. The thumbnail video can be stored in a location that is identified in the thumbnail video profile or playlist.

The video player packager component 150 is responsible for generating a playlist that includes a video profile and a thumbnail video profile. A playlist file can be generated where the playlist file identifies the video content and the thumbnail video using their corresponding profiles or variants thereof. The thumbnail video can be configured as a variant of the video content in the playlist file. The thumbnail video can be tagged with a tag or directive that is used for the thumbnail video profile. The thumbnail video can be defined as a lower resolution than the video content. In this regard, the thumbnail video can constructively be a video content variant in the playlist but with additional configurations, the thumbnail video actually functions with a thumbnail video player. For example, a tag that corresponds to a thumbnail video profile excludes the thumbnail variants, in the playlist, from playback on the video player. It is contemplated that both the video content and thumbnail video can include a plurality of variants of the video content and the thumbnail video. The video player packager component communicates the video player package to a media device for playback of the video content and playback of the thumbnail video for video scrubbing.

Cloud-based video player services can generally refer to video services made available via the internet from the cloud computing platform. In particular, the policy services component 160 can support policies for implementing the thumbnail video player feature. The policy service component can implement an adaptive bitrate (ABR) policy. Generally an ABR policy supports streaming video content based on automatically adapting to any changes in network and playback conditions of a media device streaming the video content. In one implementation, a streaming process efficiently delivers streaming video by switching among different streams (e.g., variants) of varying quality and sizes during playback.

In embodiments described herein, the policy service component can include a thumbnail video ABR policy for streaming thumbnail video. Because the thumbnail video is implemented as a variant in the playlist that includes both video profiles and thumbnail video profiles, the thumbnail video ABR policy is implemented such that the thumbnail video player only plays back the thumbnail video profile variants. More specifically, only thumbnail video variants are used with thumbnail video player. The thumbnail video player receives instructions from the video player package to execute the thumbnail video player using the thumbnail video ABR policy. It is further contemplated the thumbnail profile variant cannot be chosen with a non-thumbnail ABR policy. In this regard, the video player does not select the thumbnail video variant profile even if a media device supports playback of a bitrate of the thumbnail video variant profile. Different ABR policies (non-specific) can be used to access the thumbnail video, such as, a purely-bitrate based or tag-based. The cloud computing component 120 can support communicating the video player package and implementing the policy on the media device 170.

The video player component 172 can receive the video player package and process the package to provide thumbnail video player functionality, as discussed herein. The video player component 172 can be configured to receive an input or indication to review video content or input indication for video scrubbing. Input or indication can include a one or more of a click, touch, gesture, and selection from a user interface or other interface communication of information associated with the video player component 172. The video player component 172 can reference the video player package that includes the playlist for the video content and the thumbnail video. The video player component 172 can play back video content based on the video player package. Upon receiving an indication to review the video content, the video player component can generate a thumbnail video player that accesses thumbnail videos based on the video player package. The thumbnail video player can choose to play the video continuously directly from a point of video scrubbing, or rotate on for a predefined section length of the video content, starting from the point of video scrubbing. As such, the thumbnail video player is flexible, and other variations and combinations of playback of the thumbnail video using the thumbnail video player are contemplated with embodiments of the present invention. It is contemplated that the thumbnail video player is a second video player, and the second video player plays continuous thumbnail video based on a master playlist having both a video content variant and a thumbnail video variant. The video content and the thumbnail video can include several different variants. The thumbnail video player can be associated with a thumbnail video ABR policy such that the thumbnail video plays only the thumbnail video variants.

Figure 2:
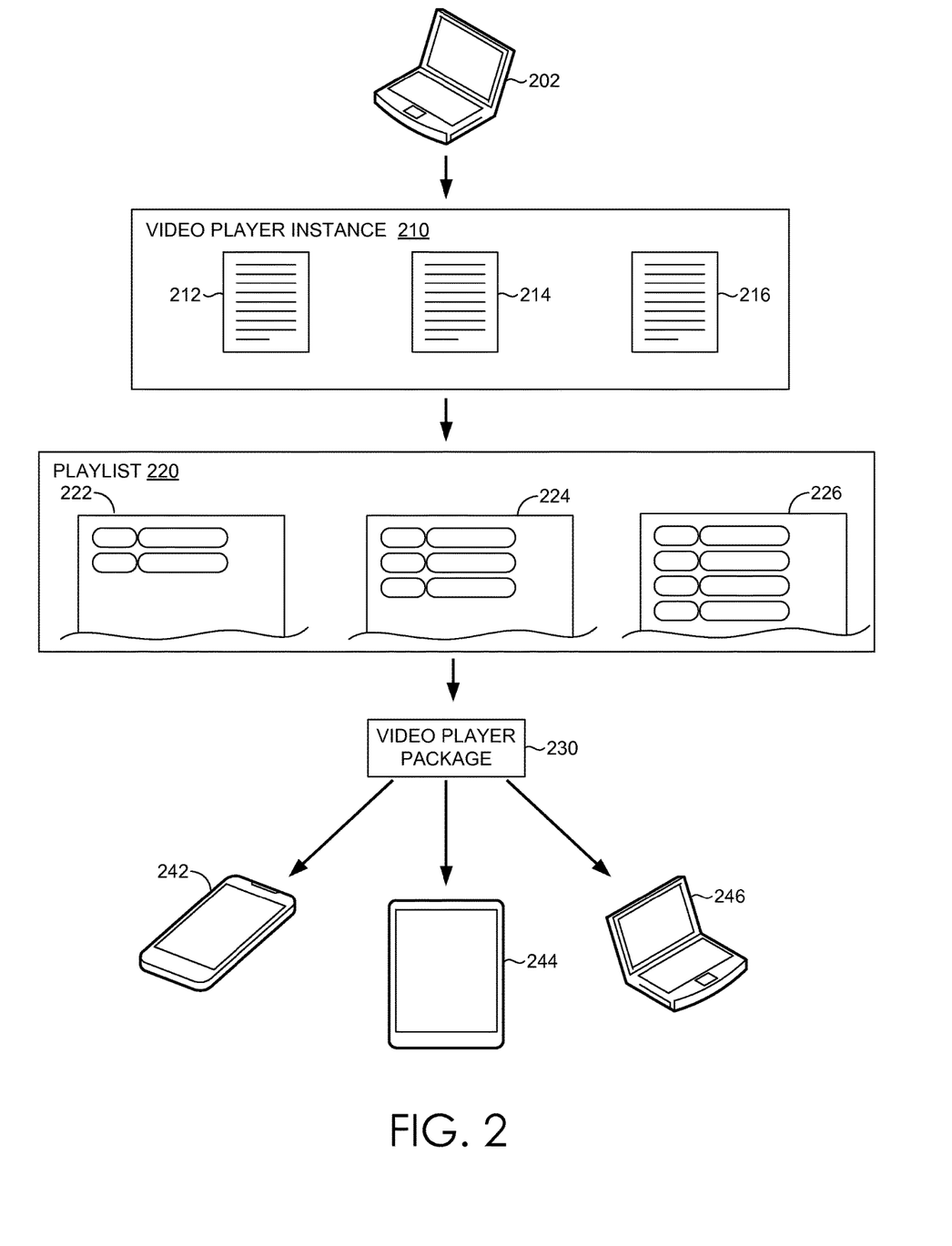
FIG. 2 is a schematic of exemplary communications between components in a video player platform system, in accordance with embodiments described herein.

With reference to FIG. 2, an exemplary schematic of communications between components of embodiments described herein is provided. Initially, a computing device 202 supporting a video player instance component can generate a video player instance 210. The computing device supports a software development kit used to generate video player instances. The video player instance 210 can be based on a video content profile 212, a thumbnail video profile 214, and optionally a thumbnail image profile 216. The video instance can include configuration instructions for video content and thumbnail video. The video player instance component in the computing device can access components in a video player platform to facilitate generating the video player instance 210. The video player instance 210 can be configured based on accessing an integrated development environment supporting the software development kit. The profiles can be associated with tags and additional attributes and metadata that are associated with a variant of the profile in a playlist.

A video player development component can access the video player instance 210 to generate a video player package 23-. The video player package 230 includes a playlist 220. Several different types of playlists (e.g., playlist 222, 224, 226) can be generated. The playlist 222 can include a variant for the video content and a variant for a thumbnail video. The playlist 224 can include a plurality of variants for the video content and a plurality of variants for the thumbnail video. The playlist 226 can include at least one variant for the video content, thumbnail video, and image thumbnail.

TABLE 1

```
#EXTM3U
#EXT-X-STREAM-INF:PROGRAM-ID=1,BANDWIDTH=396000,
http://location/main-stream4-16x9.m3u8
#EXT-X-STREAM-INF:PROGRAM-ID=1,BANDWIDTH=628000,
http:// location/ main-stream1-16x9.m3u8
#EXT-X-STREAM-INF:PROGRAM-ID=1,BANDWIDTH=728000,
http:// location /main-stream2-16x9.m3u8
#EXT-X-STREAM-INF:PROGRAM-ID=1,BANDWIDTH=1128000,
http:// location /main-stream3-16x9.m3u8
#EXT-X-STREAM-INF:PROGRAM-ID=1,BANDWIDTH=1692000,
http:// location /main-stream5-16x9.m3u8
#EXT-X-VIDEO-THUMBNAIL:RESOLUTION=160x120
http:// location /vthumb/vthumb.m3u8
#EXT-X-IMAGE-THUMBNAIL:RESOLUTION=
160x120,INTERVAL=2000
http:// location /vthumb/images/imagethumb.m3u8
```

As shown in Table 1, the playlist can refer to video profiles, thumbnail video profiles, and thumbnail image profiles. The playlist can further comprise tags for each corresponding type of profile. The thumbnail video tag excludes the thumbnail video from playback using the video player. The playlist further includes variant settings and the location of the video content, thumbnail video, and thumbnail images. It is contemplated that the thumbnail images can be used in conjunction with the thumbnail videos such that upon determination of an error with the thumbnail video the thumbnail image can be used in place of the thumbnail video.

The video package can include instructions for initializing the thumbnail video player separately from the video player. The thumbnail video player can be associated with a thumbnail adaptive bit rate (ABR) policy that instructs the thumbnail video player to exclusively access thumbnail video variants. The video development component can communicate the video package to a different types of media devices (e.g., 242, 244, and 246) requesting the video content such that the thumbnail video is played back using the thumbnail video player when video scrubbing the video content.

Figure 3:
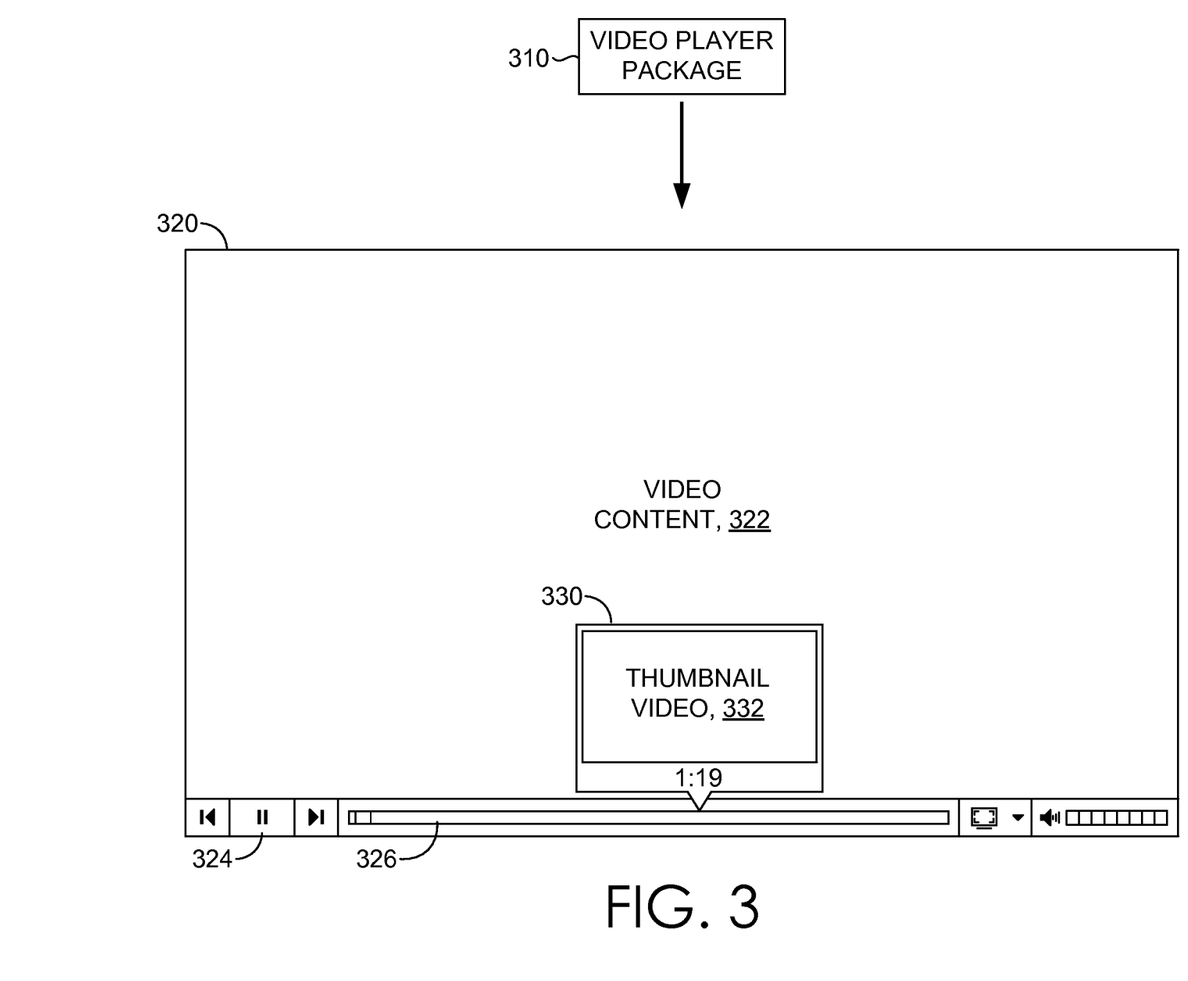
FIG. 3 is a schematic of an exemplary video player and thumbnail video player, in accordance with embodiments described herein.

With reference to FIG. 3, a schematic of an exemplary video player and thumbnail video player is illustrated. A media device can support a video player component that accesses the video player package 310. The video player package 310 includes a playlist having a video content variant and thumbnail video variant. The video player component can generate a video player 320 for video content 322 where the video content is accessed based on the playlist having the video content variant. The video player can also include interface elements such as control 324 and a timeline 326.

A user at the video player can communicate an indication to review or scrub the video content 322 in the video player 320. The video player component upon receiving the indication can generate a thumbnail video player 330 for thumbnail video 332 where the thumbnail video is accessed based on the playlist having the thumbnail variant. It is contemplated that the thumbnail video player can displayed with or without additional interface controls and annotations. For example, as shown in FIG. 3, thumbnail video player 330 indicates a time code of the thumbnail video with respect to the timeline. Other types of variations and combinations of additional interface controls and annotations of the thumbnail video player are contemplated with embodiments described herein.

In addition, the thumbnail video player can be implemented with an adaptive bit rate (ABR) policy that instructs the thumbnail video player to exclusively access thumbnail video variants in the playlist. The thumbnail video player generates the thumbnail video having a lower resolution and no audio. The thumbnail video player can have a smaller display area and displayed concurrently with the video content. The video player component can receive a selection indication of a portion of the thumbnail video which triggers navigating to a corresponding portion of the video content 322 on the video player 320.

Figure 4:
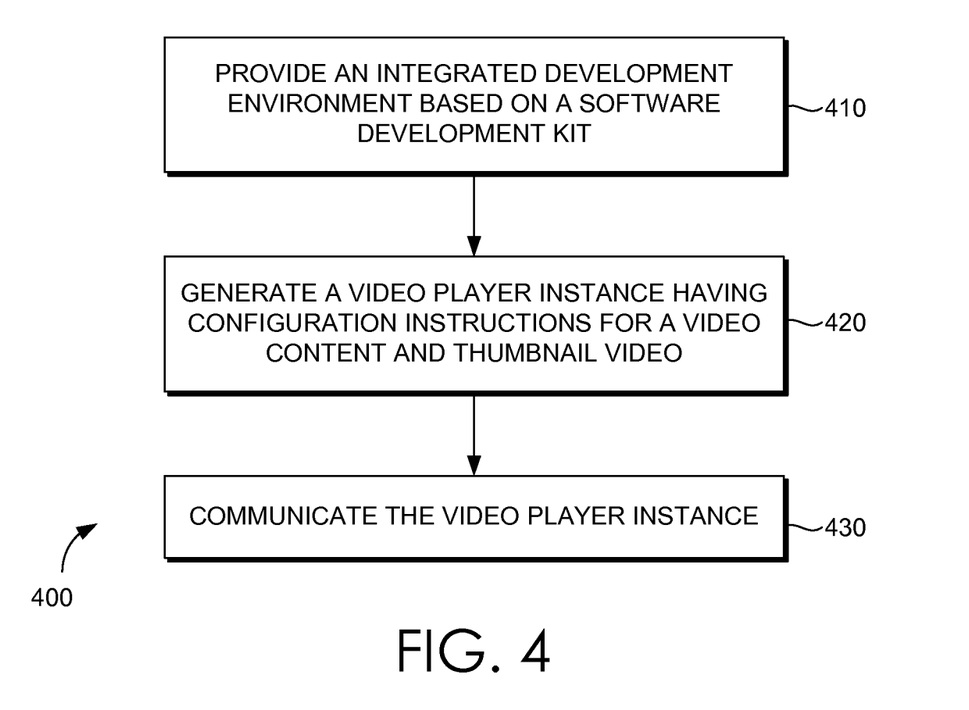
FIG. 4 is a flow diagram showing an exemplary method for providing video scrubbing based on a video player platform system that communicates a video player instance, in accordance with embodiments described herein.

Turning now to FIG. 4, a flow diagram is provided that illustrates a method 400 for providing video scrubbing based on a thumbnail video player platform system. Initially at block 410, an integrated development environment based on a software development kit is provided. At block 420, a video player instance having configuration instructions for video content and thumbnail video is generated. The video player instance is generated using a software development kit that supports thumbnail video profiles used to playback thumbnail videos in a thumbnail video player. At block 430, the video player instance is communicated for generating a video player package.

Figure 5:
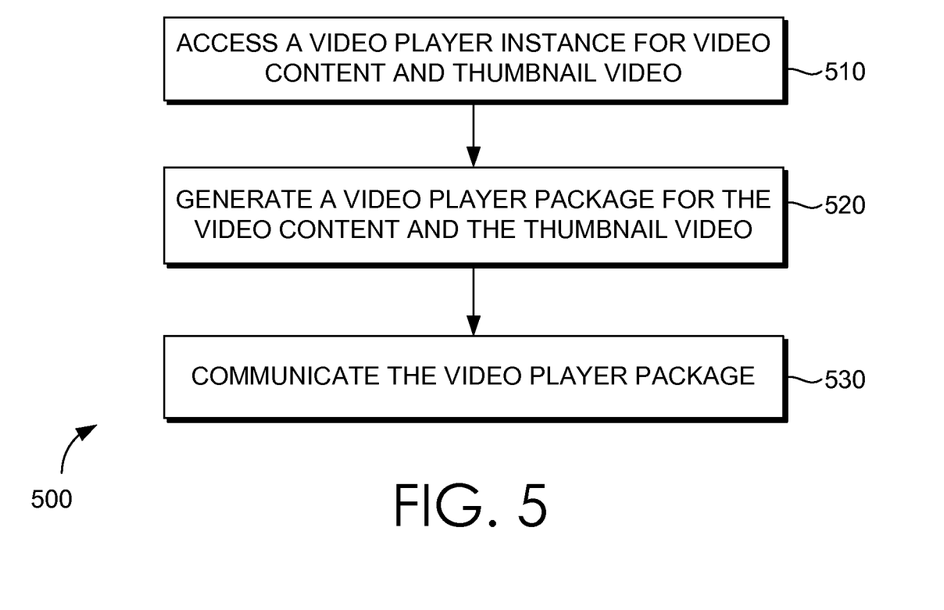
FIG. 5 is a flow diagram showing an exemplary method for providing video scrubbing based on a video player platform system that communicates a video player package, in accordance with embodiments described herein.

Turning now to FIG. 5, a flow diagram is provided that illustrates a method 500 for providing video scrubbing based on a thumbnail video player platform system. Initially at block 510, a video player instance for video content and thumbnail video is accessed. The video player instance comprises configuration instructions for video content and thumbnail video content. At block 520, a video player package for the video content and the thumbnail video is generated, where the video player package comprises a playlist having a video content variant and a thumbnail video variant. At block 530, the video player package is communicated such that the thumbnail video is played back using the thumbnail video player when video scrubbing the video content.

Figure 6:
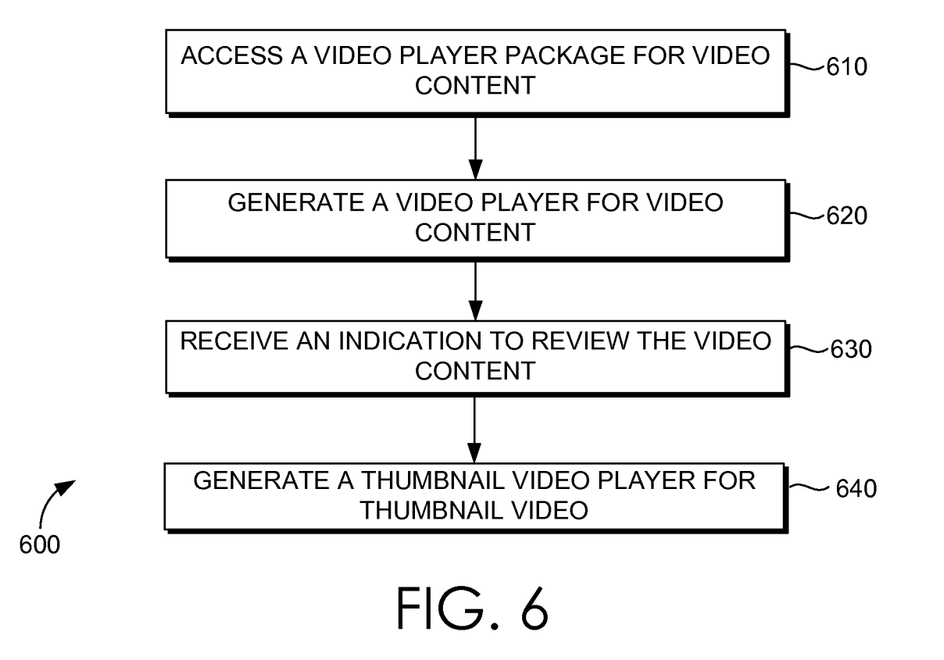
FIG. 6 is a flow diagram showing an exemplary method for providing video scrubbing based on a thumbnail video player platform system that generates a thumbnail video player for thumbnail video, in accordance with embodiments described herein.

Turning now to FIG. 6, a flow diagram is provided that illustrates a method 600 for providing video scrubbing based on a thumbnail video player platform system. Initially at block 610 a video player package is accessed, the video player package comprises a playlist having a video content variant and thumbnail video variant. At block 620, a video player for video content is generated, where the video content is accessed based on the playlist having the video content variant. At block 630, an indication to review the video content is received. At block 640, a thumbnail video player for thumbnail video is generated, where the thumbnail video is accessed based on the playlist having the thumbnail variant.

With reference to the video player system, embodiments described herein can improve video scrubbing based on components implemented based on a video player platform. Video player platform components refer to integrated components that facilitate the generating and communicating video player instances and packaging and communicating video player packages to support thumbnail video players and thumbnail videos. The integrated components refer to the hardware architecture and software framework that support interactive video functionality using the video player platform. The hardware architecture refers to physical components and interrelationships thereof and the software framework refers to software providing functionality that can be implemented with hardware operated on a device. The end-to-end software-based video player platform can operate within the video player platform components to operate computer hardware to provide video player platform functionality. As such, the video player platform components can manage resources and provide services for the thumbnail video functionality. Any other variations and combinations thereof are contemplated with embodiments of the present invention.

By way of example, the video player platform can include an API library that includes specifications for routines, data structures, object classes, and variables may support the interaction the hardware architecture of the device and the software framework of the unified thumbnail video player platform system. These APIs include configuration specifications for the thumbnail video player platform system such that the video player instance component, the video player development component and the video player component can communicate with each other in the video player platform, as described herein.

A video player platform can be implemented on a distributed computing system (e.g., cloud computing platform 120) that runs cloud applications and services across different data centers and geographic regions. The cloud computing platform 120 can implemented using a scheduler component for provisioning and managing resource allocation, deployment/upgrade, and management of cloud applications and services. Typically, a cloud computing platform acts to store data or run applications and services in a distributed manner. The application and service components of the cloud computing platform 120 may include nodes (e.g., computing devices, processing units, or blades in a server rack) that are allocated to run one or more portions of applications and services.

When multiple applications and services are being supported by the nodes, the nodes may be partitioned into virtual machines or physical machines that concurrently run the separate service applications, respectively, in individualized computing environments that support the resources and/or operating system specific to each service application. Further, each application or service may be divided into functional portions such that each functional portion is able to run on a separate virtual machine. In cloud computing platforms, multiple servers may be used to run the applications and services to perform data storage operations in a cluster. In particular, the servers may perform data operations independently but exposed as a single device referred to as a cluster. Each server in the cluster may be referred to as a node. A cloud-based implementation of the video player platform can leverage the scalability and durability of the corresponding cloud computing platform to support the layered interactive video functionality described herein.

Figure 7:
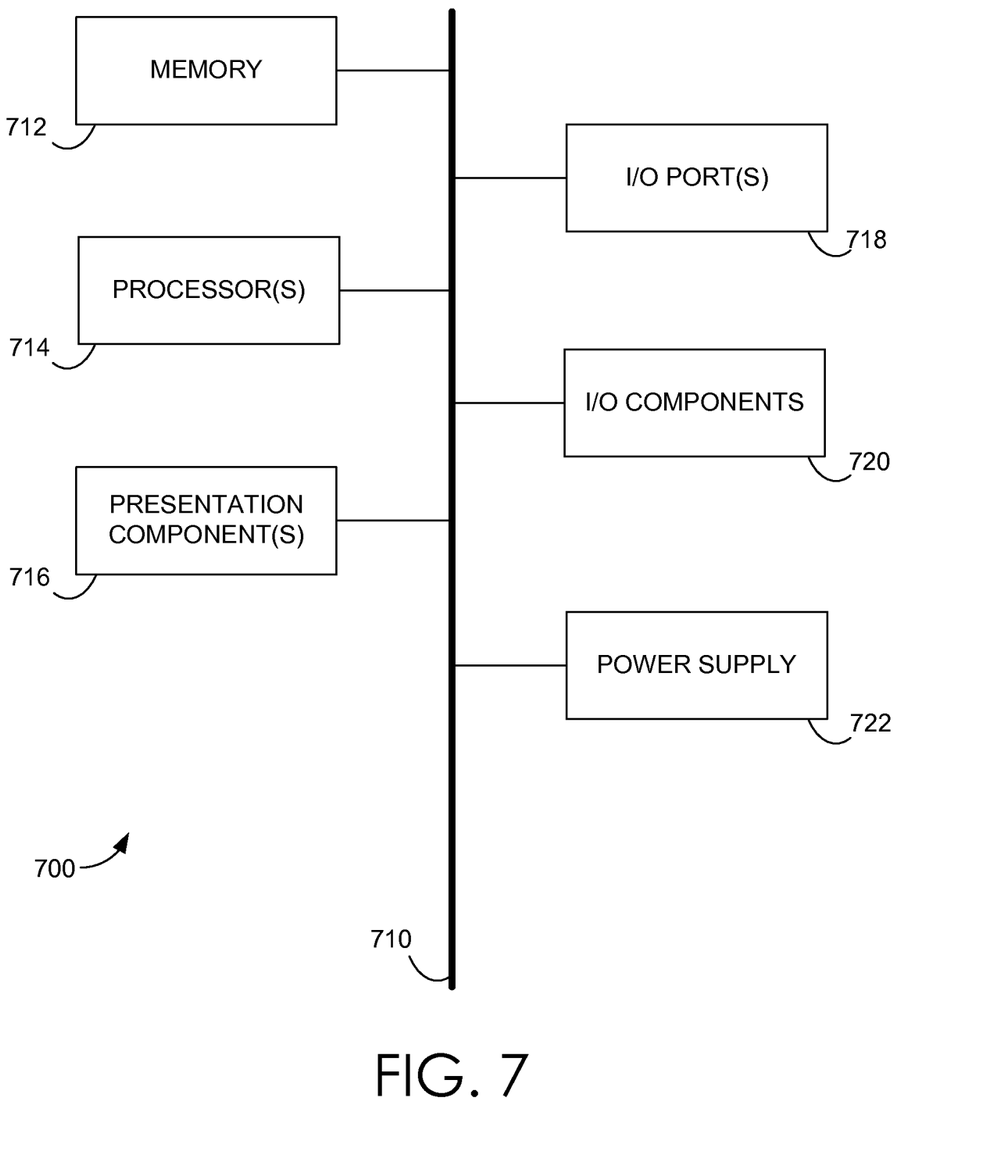
FIG. 7 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments are described with reference to distributed computing devices, components, and a video player platform that supports video scrubbing using a thumbnail video player. Components can be configured for performing novel aspects of embodiments, where configured for comprises programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, causes the one or more processors to perform a method for providing video scrubbing using thumbnail players, the method comprising:

accessing a video player package, the video player package comprising an adaptive bitrate playlist of a variant service having a plurality of variants comprising both a set of video content variants and a set of thumbnail video variants, wherein a playlist tag indicates that a variant in the plurality of variants is a video content variant or a thumbnail video variant to restrict automatic selection of the variant in the playlist such that the set of video content variants are exclusively accessed by a first video player based on a first tag and the set of thumbnail video variants are exclusively accessed by a second video player based on a second tag;

generating the first video player as a video player to access video content associated with the set of video content variants, wherein accessing the video content comprises:
(1) accessing the second tag associated with the set of thumbnail video variants;
(2) responsive to accessing the second tag, excluding the set of thumbnail video variants from being accessible via the playlist to support playback using the first video player; and
(3) responsive to excluding the set of thumbnail variants, accessing a video content variant in the set of video content variants;

generating the second video player as a thumbnail video player to access thumbnail video associated with the set of thumbnail video variants, wherein accessing the thumbnail video comprises:
(1) accessing the first tag associated with the set of video content variants;
(2) responsive to accessing the first tag excluding the set of video content variants from being accessible via the playlist to support playback using the second video player; and
(3) responsive to excluding the set of video variants, accessing a thumbnail video variant in the set of thumbnail video variants; and
causing playback of the thumbnail video in the second video player.

2. The media of claim 1, wherein the video content variant is tagged with the first tag that designates the video content for playback on the video player and the thumbnail video player is tagged with the second tag that designates the thumbnail video for playback on the thumbnail video player.

3. The media of claim 1, wherein the adaptive bit rate playlist is associated with a thumbnail video variant adaptive bitrate policy that instructs the thumbnail video player to bypass the set of video variants and exclusively access the set of thumbnail video variants in the adaptive bitrate playlist, wherein accessing the thumbnail video player is restricted from adaptively switching to the set of video content variants.

4. The media of claim 1, wherein the thumbnail video player generates the thumbnail video having a lower resolution and a smaller display area than the corresponding video content.

5. The media of claim 1, wherein the thumbnail video player generates the thumbnail video as video only.

6. The media of claim 1, further comprising:
receiving a selection indication of a portion of the thumbnail video; and
navigating to a corresponding portion of the video content on the video player.

7. A computer-implemented method for providing video scrubbing using thumbnail video players, the method comprising:

accessing a video player instance for video content and thumbnail video, the video player instance comprising configuration instructions for video content and thumbnail video;

generating a video player package for the video content and the thumbnail video, the video player package comprising an adaptive bitrate playlist of a variant service having a plurality of variants comprising a set of video content variants and a set of thumbnail video variants, wherein a playlist tag indicates that a variant in the plurality of variants is a video content variant or a thumbnail video variant to restrict automatic selection of the variant in the playlist such that the set of video content variants are exclusively accessed by a first video player based on a first tag and the set of thumbnail video variants are exclusively accessed by a second video player based on a second tag;

communicating the video player package to cause generating the second video player as a thumbnail video player to access thumbnail video associated with the set of thumbnail video variants, wherein accessing the thumbnail video comprises:
(1) accessing the first tag associated with the set of video content variants;
(2) responsive to accessing the first tag, excluding the set of video content variants from being accessible via the playlist to support playback using the second video player; and
(3) responsive to excluding the set of video variants, accessing a thumbnail video variant in the set of thumbnail video variants; and
causing playback of the thumbnail video in the second video player.

8. The method of claim 7, wherein generating the video player package further comprises downsizing a resolution of the video content, the resolution of the video content is downsized from a first resolution to a second resolution used as a resolution of the thumbnail video, the second resolution is lower than the first resolution.

9. The method of claim 7, wherein generating the video player package further comprises converting the video content to thumbnail video as video-only.

10. The method of claim 7, wherein generating the video player package further comprises tagging the video content with the first tag and tagging the thumbnail video with the second tag, the first tag and the second tag designate corresponding variants for the video player instance and the thumbnail video player respectively.

11. The method of claim 7, wherein the second tag excludes the thumbnail video from playback using the video player, the thumbnail video is constructively a variant of the video content in the playlist.

12. The method of claim 7, wherein the thumbnail video corresponds to the thumbnail video player, the thumbnail video player is a video scrubbing video player associated with the thumbnail video variant and a thumbnail video variant adaptive bitrate policy, wherein the thumbnail video variant adaptive bitrate policy instructs the second video player to access the thumbnail video variant.

13. The method of claim 7, wherein the video player instance is generated based on accessing an integrated development environment providing a software development kit for the video player instance, the integrated development environment comprises application programming interfaces for generating the video player instance.

14. The method of claim 7, further comprising communicating the video player package such that the thumbnail video is played back at a media device using the thumbnail video player when video scrubbing the video content.

15. A system for providing video scrubbing using thumbnail video players, the system comprising:
   a processor and a memory configured for providing computer program instructions to the processor;
   a video player component configured for:
   accessing a video player package, the video player package comprising an adaptive bitrate playlist of a variant service having a plurality of variants comprising both a set of video content variants and a set of thumbnail video variants, the adaptive bitrate playlist configured to support both the set of video content variants and the set of thumbnail video variants for previewing uninterrupted video content,
   wherein a playlist tag indicates that a variant in the plurality of variants is a video content variant or a thumbnail video variant to restrict automatic selection of the variant in the playlist such that the set of video content variants are exclusively accessed by a first video player based on a first tag and the set of thumbnail video variants are exclusively accessed by a second video player based on a second tag; and
   generating the second video player as a thumbnail video player to access thumbnail video associated with the set of thumbnail video variants, wherein accessing the thumbnail video comprises:
     (1) accessing the first tag associated with the set of video content variants;
     (2) responsive to accessing the first tag, excluding the set of video content variants from being accessible via the playlist to support playback using the second video player; and
     (3) responsive to excluding the set of video variants, accessing a thumbnail video variant in the set of thumbnail video variants; and
   causing playback of the thumbnail video in the second video player.

16. The system of claim 15, the system further comprising:
   a video player development component configured for:
   accessing the video player instance for the video content and the thumbnail video;
   generating the video player package for the video content and the thumbnail video, the video player package comprises the adaptive bitrate playlist having the video content variant and the thumbnail video variant; and
   communicating the video player package such that the thumbnail video is played back using the thumbnail video player when video scrubbing the video content.

17. The system of claim 15, the system further comprising:
   a video player instance component configured for:
   generating a video player instance having configuration instructions for video content and thumbnail video, wherein the video player instance is generated using a software development kit that supports thumbnail video profiles used to playback thumbnail videos in a thumbnail video player; and
   communicating the video player instance.

18. The system of claim 17, wherein generating the video player instance further comprises selecting at least one video content profile and at least one thumbnail video profile.

19. The system of claim 17, wherein a video content profile is associated with the first tag and a thumbnail video profile is associated with the second tag, wherein the first tag and the second tag designate corresponding profiles for the video player and the thumbnail video player respectively.

20. The system of claim 19, wherein the video content profile or the thumbnail video profile is a record of attributes and metadata of the corresponding video.

21. The system of claim 19, wherein the video content profile or the thumbnail video profile comprises one of: a live thumbnail video profile or a video on demand (VOD) thumbnail video profile.

22. The system of claim 17, wherein generating the video player instance comprises referencing, from a video player development component, one or more of the following: a video component, a video player packager component, and a policy services component.

23. The system of claim 17, wherein the video player instance component is further configured for:
   providing an integrated development environment based on the software development kit, the integrated development environment comprises application programming interfaces for generating the video player instance.

* * * * *